(12) United States Patent
Kwon et al.

(10) Patent No.: US 7,789,781 B2
(45) Date of Patent: Sep. 7, 2010

(54) TIMING BELT STRUCTURE WITH CORNER GROOVE

(76) Inventors: Young Doo Kwon, 106-2103 Jeonghwa-wooband-palace 72, Sang-dong, Sooseong-gu, Daegu (KR); Hyun Wook Kwon, 5-509 San-gyouk-Bosung, APT, 493 San-gyouk2-dong, Bug-gu, Daegu (KR); Weon Kook Choi, 302, Dowon-villart, 3012-12 Daemyung4-dong, Nam-gu, Daegu (KR); Hyok Chun Kwon, 1106-31 Pyung-ri2-dong, Seo-gu, Daegu (KR)

( * ) Notice: Subject to any disclaimer, the term of this patent is extended or adjusted under 35 U.S.C. 154(b) by 569 days.

(21) Appl. No.: 11/344,734

(22) Filed: Feb. 2, 2006

(65) Prior Publication Data

US 2007/0111836 A1 May 17, 2007

(30) Foreign Application Priority Data

Nov. 15, 2005 (KR) ...................... 10-2005-0109310

(51) Int. Cl.
*F16G 9/00* (2006.01)
*F16G 1/00* (2006.01)
*F16G 5/00* (2006.01)
*F16G 1/28* (2006.01)
*F16G 1/08* (2006.01)
*F16H 55/16* (2006.01)

(52) U.S. Cl. ................. 474/152; 474/153; 474/164; 474/202; 474/204; 474/251; 83/257

(58) Field of Classification Search ................. 474/152, 474/249–251, 153; 74/25; 198/833
See application file for complete search history.

(56) References Cited

U.S. PATENT DOCUMENTS

| 3,756,091 | A | * | 9/1973 | Miller | 474/153 |
| 2003/0083166 | A1 | * | 5/2003 | Oertley | 474/162 |
| 2003/0148840 | A1 | * | 8/2003 | Linck et al. | 474/153 |

FOREIGN PATENT DOCUMENTS

JP 2001311455 A * 11/2001

* cited by examiner

*Primary Examiner*—Robert A Siconolfi
*Assistant Examiner*—San Aung
(74) *Attorney, Agent, or Firm*—Grant D. Kang; Kang Intellectual Property Law, LLC

(57) ABSTRACT

The timing belt and a coupling structure of the same are disclosed, in which a stress focused at a corner portion decreases by forming an optimum shaped groove at a corner portion of a timing belt, so that it is possible to largely increase a fatigue life span of a timing belt and a durability of a timing belt. In addition, noises and vibrations can be minimized by forming a through hole at a threaded surface of a timing belt or a threaded portion of a sprocket. In the timing belt, which has threads at a belt body, there is provided an improved timing belt comprising a groove formed at a corner portion in which the threads and the belt body contact with each other.

2 Claims, 8 Drawing Sheets before use after use

TIMING BELT STRUCTURE WITH CORNER GROOVE

TECHNICAL FIELD

The present invention relates to a timing belt and a coupling structure of the same, and in particular to a timing belt and a coupling structure in which an optimized groove is formed at a corner portion contacting with a thread portion and a belt body, so that a stress applied to the corner portion is decreased, and durability of a timing belt is enhanced. In addition, a through hole is formed at a threaded surface or a sprocket for thereby minimizing noises and vibrations.

BACKGROUND ART

Generally, a timing gear represents a gear or pulley which is attached to a front end of a crank shaft and a cam shaft installed in an engine part of a vehicle, so that a valve opening and closing timing is synchronized with a rotation of a crank shaft. There is provided a chain type in which a chain is used to connect a gear of a crank shaft and a gear of a cam shaft. In a belt type, a timing belt is used. In a gear type, a spur gear is used with its accurate transmission of a driving force. In the case that a distance between the shafts is large, the chain type and the belt type have been generally used. The use of a low cost belt type increases as compared to expensive chain type.

A V-shaped rib engaging with the gear is formed at a surface of the timing belt. The belt is made of a certain fiber, which is not flexible, such as a rubber or a glass fiber. With its light and low noise characteristic and no need of lubricant, the belt has been used for a reciprocation type engine.

FIG. 1 is a view illustrating a conventional coupling structure of a timing belt, FIG. 2 is a cross sectional view and stress analysis result of a conventional trapezoid thread shaped timing belt, FIG. 3 is a cross sectional view and stress analysis result of a conventional semicircular thread shaped timing belt, and FIG. 4 is an enlarged view illustrating a surface of a jacket of a conventional timing belt.

As shown in FIG. 1, a timing belt 40 is connected over a cam shaft sprocket 10, a crank shaft sprocket 20, and an oil pump sprocket 30 for thereby connecting the corresponding sprockets. A tensioner pulley 11 contacts with the timing belt 40 connected between the camshaft sprocket 10 and the crankshaft sprocket 20. An idler pulley 31 contacts the timing belt 40 connected between the oil pump sprocket 30 and the camshaft sprocket 10.

With the above-described construction, when the engine starts, the valve opening and closing timing is synchronized with the rotation of the crankshaft.

In FIG. 1, reference numeral 12 represents a timing mark, 13 represents a tensioner arm, and 14 represents an automatic tensioner.

As shown in FIGS. 2 and 3, in the timing belt 40 disposed over the sprockets 10, 20 and 30 and the pulleys 11 and 31, a plurality of threads 43 are formed at the belt body 42 at regular intervals in the direction (namely, horizontal direction) of the crank shaft or the cam shaft. A plurality of gear surfaces are formed on the outer surfaces of the cam shaft sprocket 1 and the crank shaft sprocket 20 to correspond with the threads 43.

As shown in FIGS. 2 and 3, the threads 43 of the conventional timing belt are formed in a trapezoid or semicircular shape. A jacket formed of nylon is covered on the threads 43 for thereby fabricating the conventional timing belt.

However, in the case of the timing belt 40 having the above-described threads 43, the stress of the sprockets 10, 20 and 30 is focused at the corner portion 45 contacting with the threads 43 and the belt body 42, so that as shown in FIG. 4, the jacket (formed of nylon having high durability) may be worn out based on the repeated contacts with the sprockets 10, 20 and 30. As shown in FIGS. 2 and 3, the stress is supported only by the rubber material provided at the lower side of the jacket, so that cracks may occur at the corner portion 45 by fatigue stress. In addition, the threads may be disengaged for thereby decreasing the life span.

In addition, in the case of the timing belt, as the timing belt rotates, when the belt threads 43 are engaged at the threaded portions of the sprockets 10, 20 and 30, the air cannot be efficiently discharged from the threaded portions between the belt threads 43 and the sprockets 10, 20 and 30, so that noises and vibrations increase.

DISCLOSURE OF THE INVENTION

Accordingly, it is an object of the present invention to provide a timing belt and a coupling structure of the same which overcome the problems encountered in the conventional art.

It is another object of the present invention to provide a timing belt and a coupling structure of the same in which a stress focused at a corner portion decreases by forming an optimum shaped groove at a corner portion of a timing belt, so that it is possible to largely increase a fatigue life span of a timing belt and a durability of a timing belt.

It is further another object of the present invention to provide a timing belt and a coupling structure of the same in which noises and vibrations can be minimized by forming a through hole at a threaded surface of a timing belt or a threaded portion of a sprocket.

To achieve the above objects, in a timing belt which has threads at a belt body, there is provided an improved timing belt comprising a groove formed at a corner portion in which the threads and the belt body contact with each other.

A reinforced layer is coated on a surface of the timing belt, and said reinforced layer is coated along the groove.

A through groove is formed on a surface of the belt thread in a width direction, with the surface of the same contacting with the sprocket.

In order to achieve the above objects, in a timing belt coupling structure which is coupled with a timing belt and a sprocket, there is provided an improved timing belt coupling structure, comprising a through hole is formed at a threaded portion of the sprocket in a width direction.

MODES FOR CARRYING OUT THE INVENTION

Figure 1:
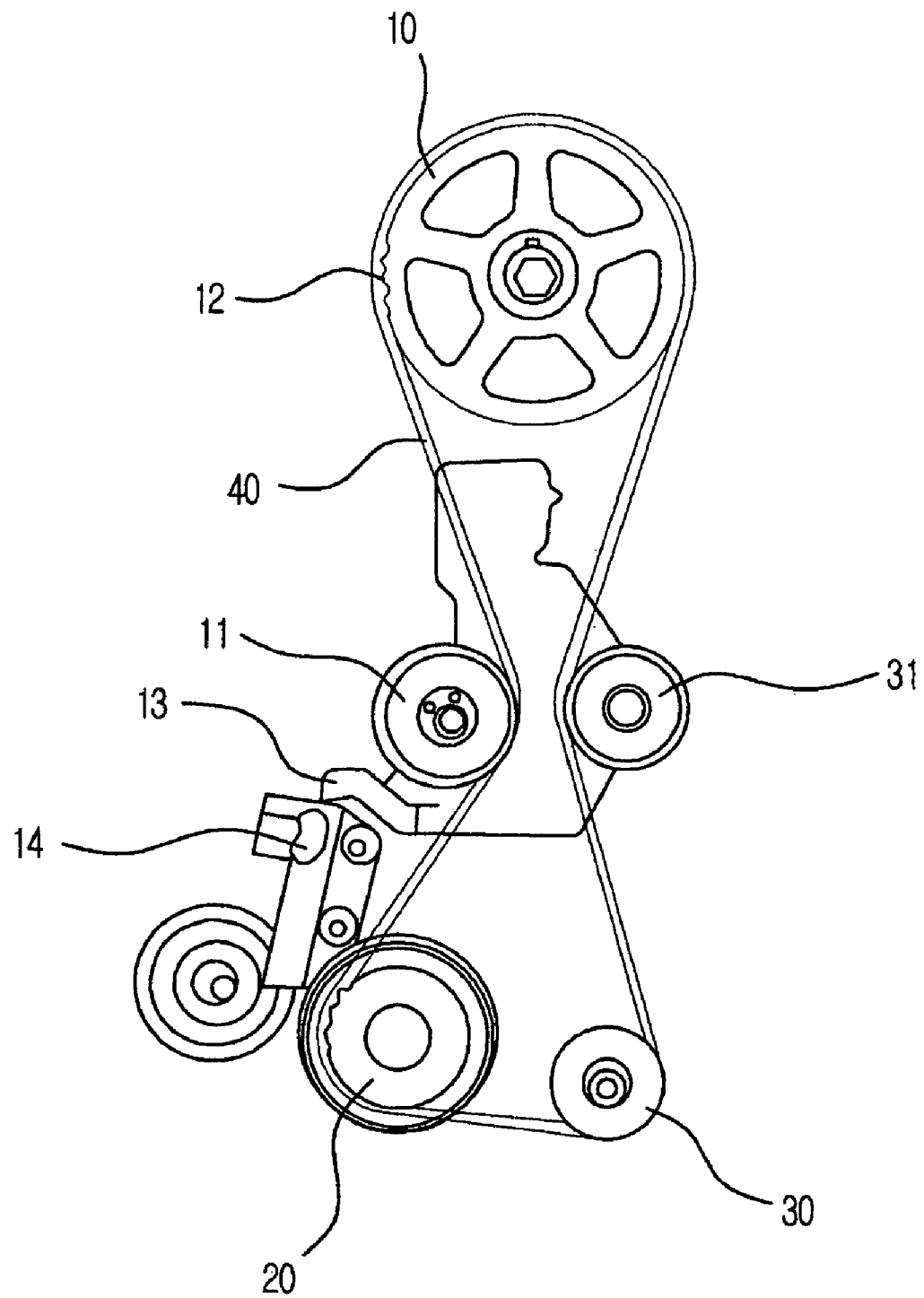
FIG. 1 is a view illustrating a conventional coupling structure of a timing belt.
Figure 2:
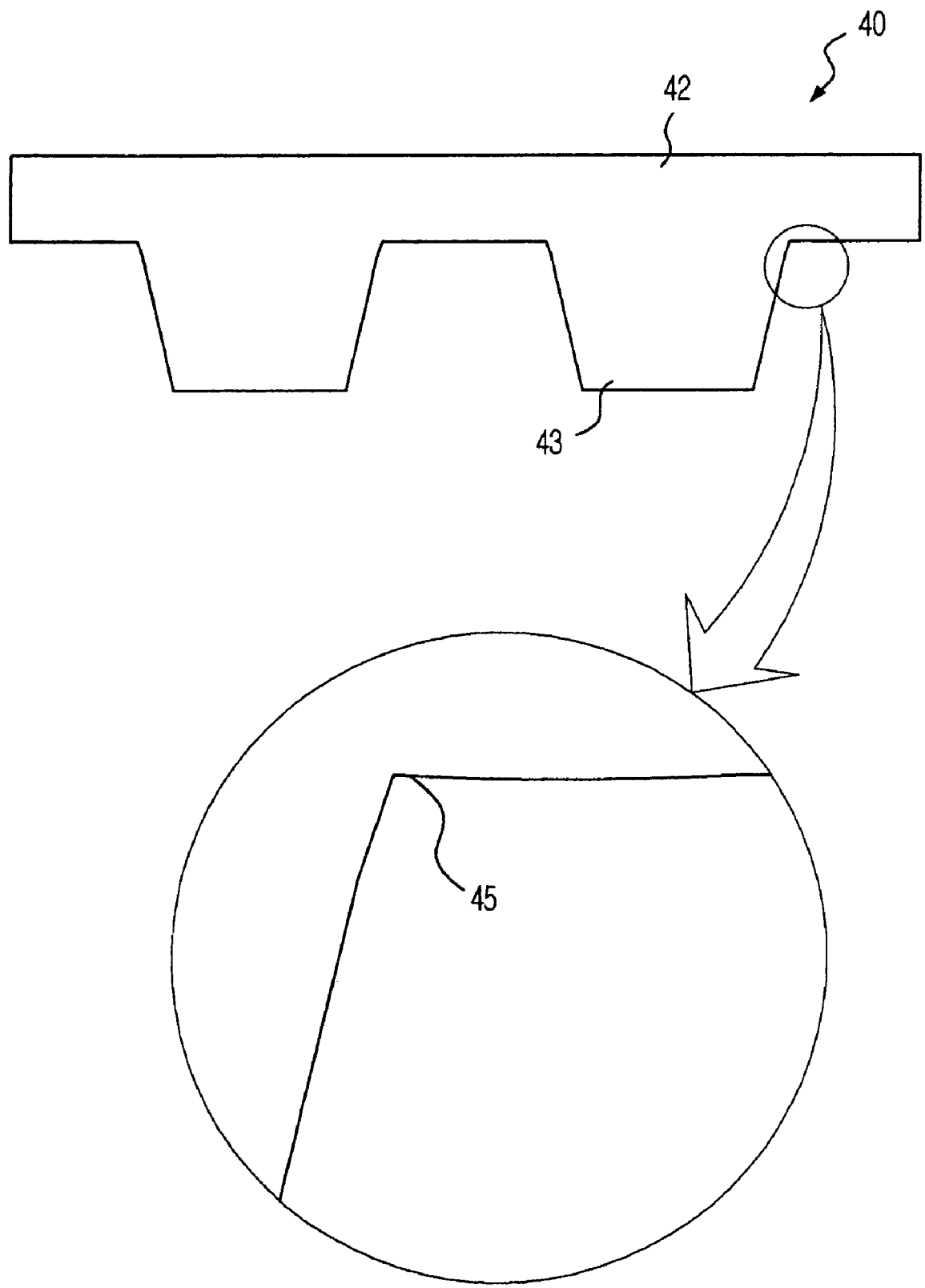
FIG. 2 is a cross sectional view and stress analysis result of a conventional trapezoid thread shaped timing belt.
Figure 3:
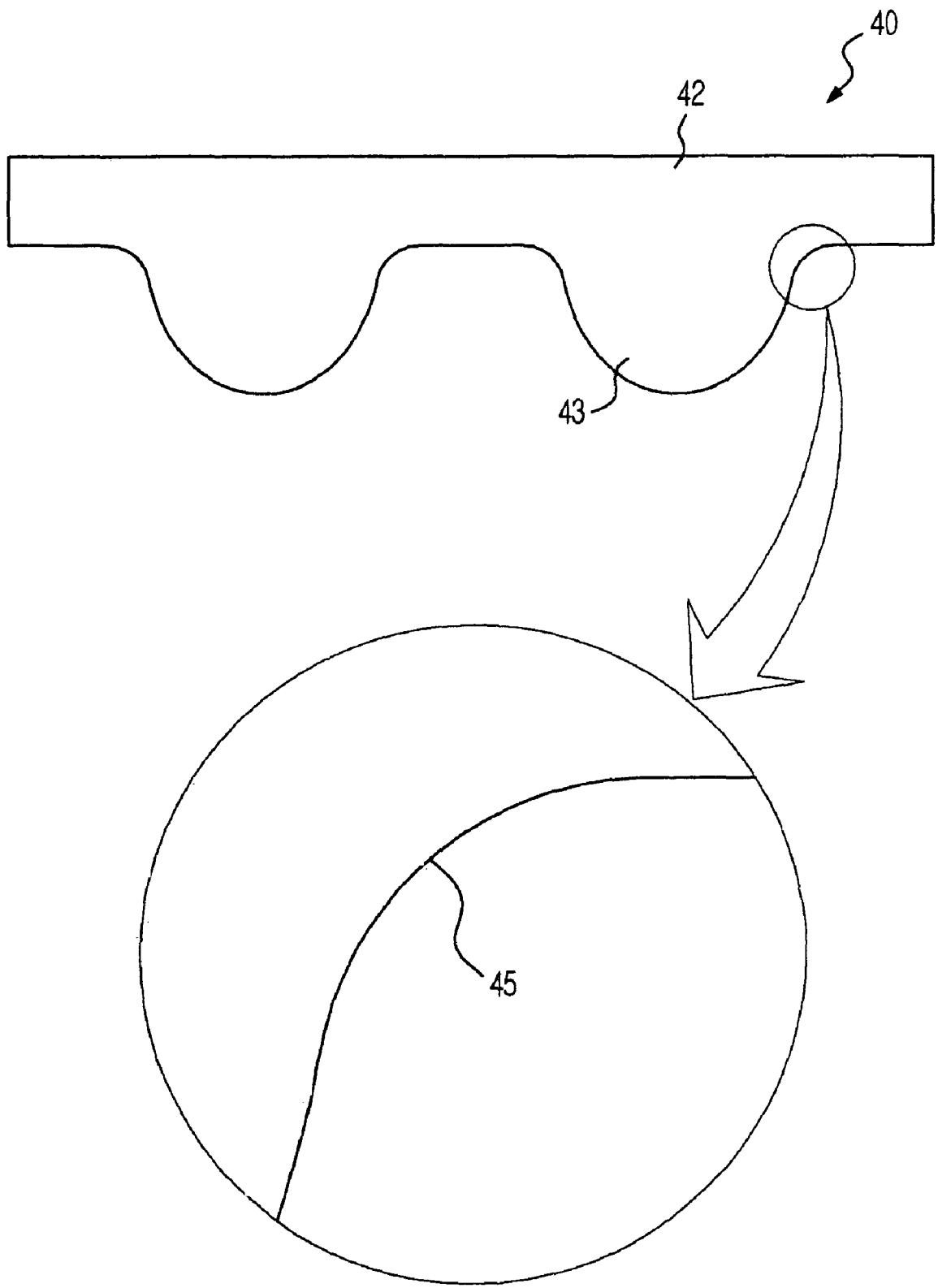
FIG. 3 is a cross sectional view and stress analysis result of a conventional semicircular thread shaped timing belt.
Figure 4:
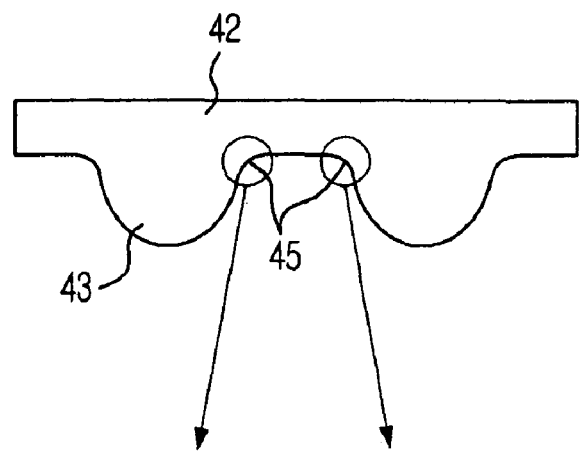
FIG. 4 is an enlarged view illustrating a surface of a jacket of a conventional timing belt.
Figure 4:
Figure 4:
Figure 5:
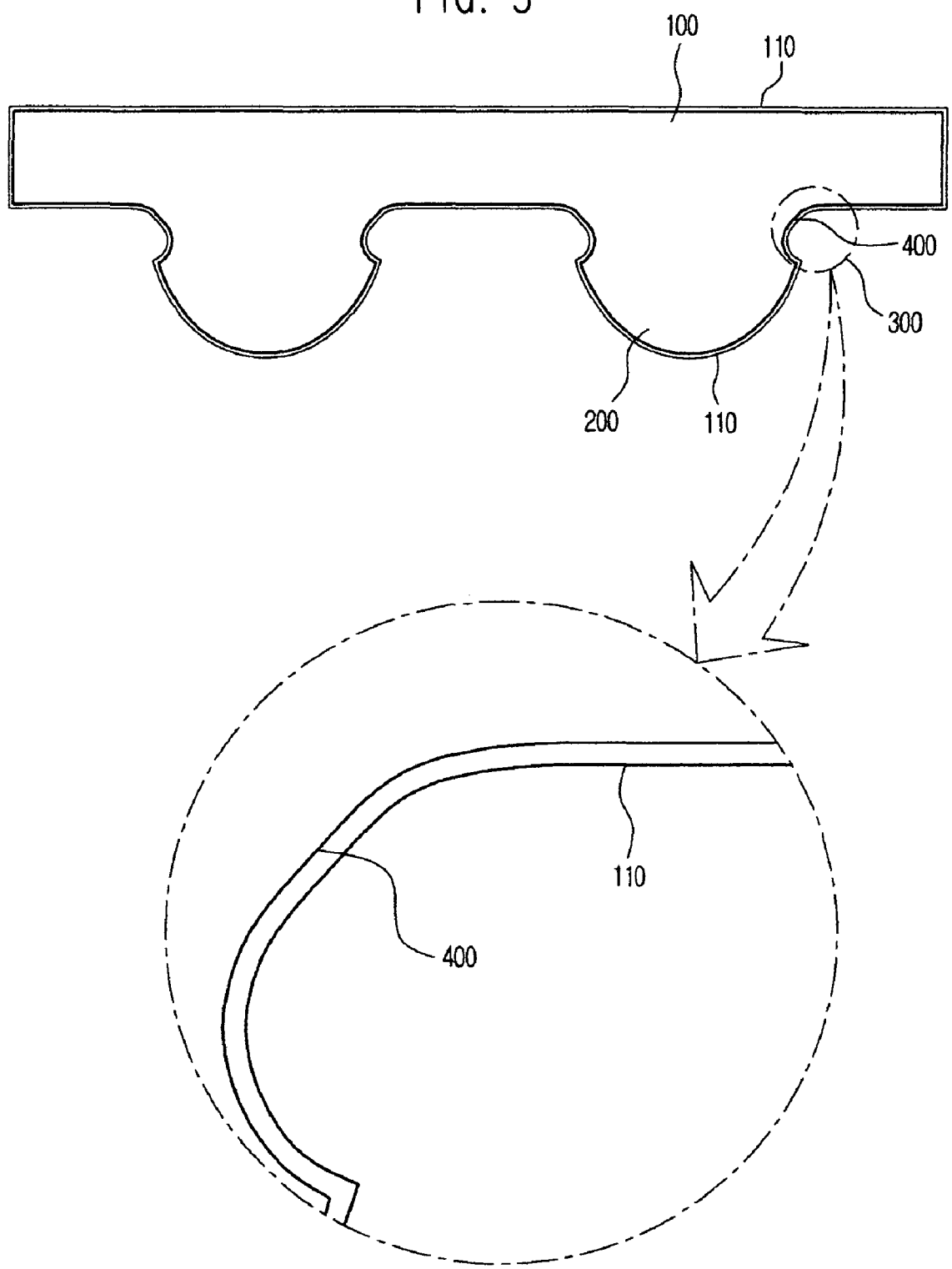
FIG. 5 is a cross sectional view and stress analysis result of a timing belt according to an embodiment of the present invention.

As shown in FIG. 5, the timing belt according to the present invention, comprises a belt body 100, and threads 200 formed at the belt body 100 at regular intervals.

The threads 200 are formed in a certain shape among a trapezoid shape, a semicircular shape, and a conventional thread shape. As shown, the threads 200 protrude from the rest of the belt body 100. The threads 200 may be also referred to as "teeth."

An optimum shape groove 400 is formed at a corner portion 300 in which the belt body 100 contacts with the threads 200.

The grooves 400 are formed at the corner portion 300 in width directions, so that a stress is prevented from being focused at the corner portion 300, with the stress occurring due to the sprocket 500, whereby it is possible to enhance the durability and anti-abrasion property of the timing belt.

Here, the groove 400 is preferably formed in a larger size as compared to the threaded surface of the gear of the sprocket 500 contacting with the timing belt.

Therefore, it is possible to prevent the threaded surface of the gear of the sprocket 500 from directly contacting with the groove 400, so that the anti-abrasion property of the timing belt can be significantly enhanced.

The size of the groove 400 is related with the size of the gear blade. It is preferable to determine an optimum shape groove capable of the stress of the corner portion 300 of the timing belt can be minimized based on a limited element analysis.

Since the groove 400 is formed at the portion in which the stress is focused, a stress focused portion does not directly contact with the threaded surface of the gear of the sprocket 500, so that the abrasion of the sprocket decreases, and the life span of the timing belt is enhanced.

The groove 400 preferably has an angle formed in contact with the belt body 100, which angle is smaller than the angle formed in contact with the thread 200 of the timing belt.

Figure 6:
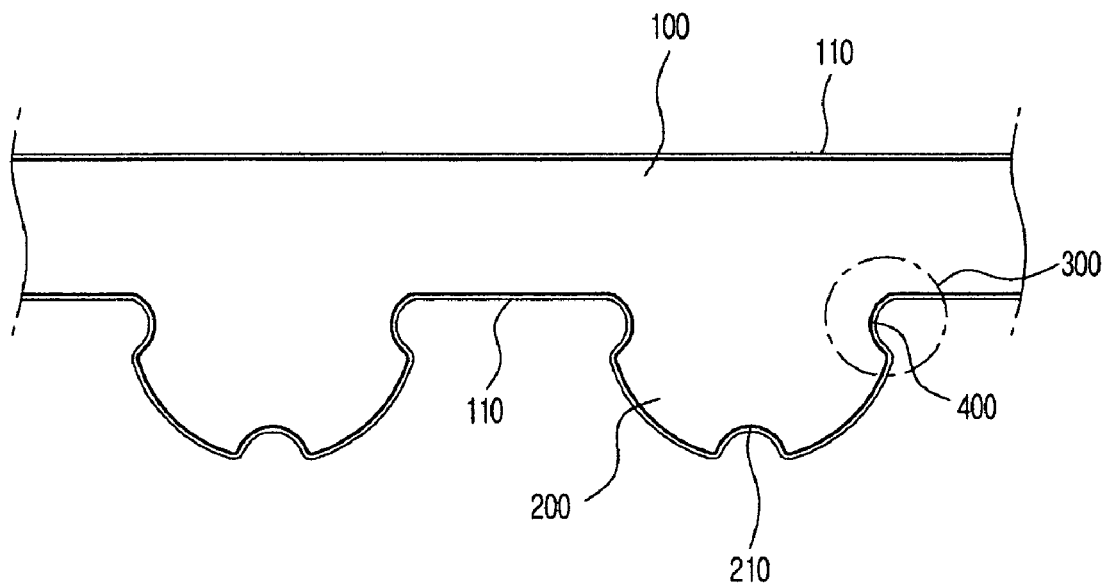
FIG. 6 is a cross sectional view illustrating a timing belt according to an embodiment of the present invention.
Figure 7:
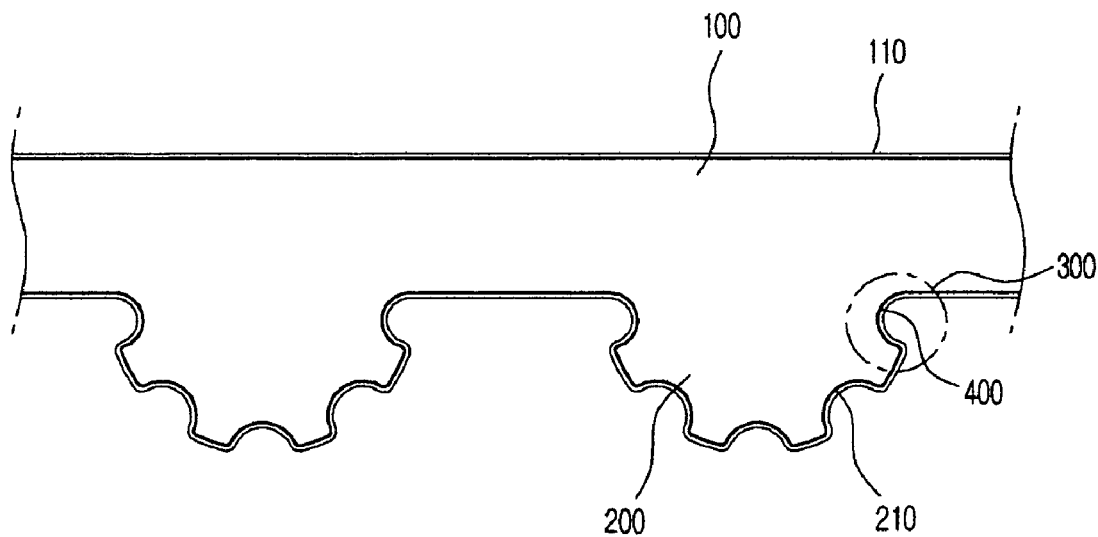
FIG. 7 is a cross sectional view illustrating a timing belt according to another embodiment of the present invention.

Namely, as shown in FIGS. 5, 6, and 7, substantially all portion of the groove 400 formed at the corner is disposed at a lower side or root portion of the surface of the thread 200 of the timing belt. As best seen in FIG. 5, the corner groove 400 is preferably tangent to the lane of the base surface of the belt body.

As shown in FIGS. 5-7, the corner grooves 400 are recessed or cut into the thread or tooth 200 so as to reduce the thickness of the tooth 200 in the root portion. In other words, the corner grooves 400 are portions where a certain amount of volume (material) is removed. FIGS. 5-7 also show that substantially all portion of the corner groove 400 is disposed within the thread or tooth 200. In other words, the corner groove 400 is disposed solely within the tooth 20, and no substantial portion of the corner groove 400 is disposed within the base body. Yet in other words, the corner groove 400 is recessed or cut into the tooth 200 only, and not recessed or cut into the base body.

In addition, a reinforced layer 110 made of a nylon material is coated on the surface of the timing belt, and the layer 110 is coated along the groove 400.

With the above construction, the layer 110 does not directly contact with the threaded surface of the gear thereby preventing the abrasion of the layer 110.

Figure 8:
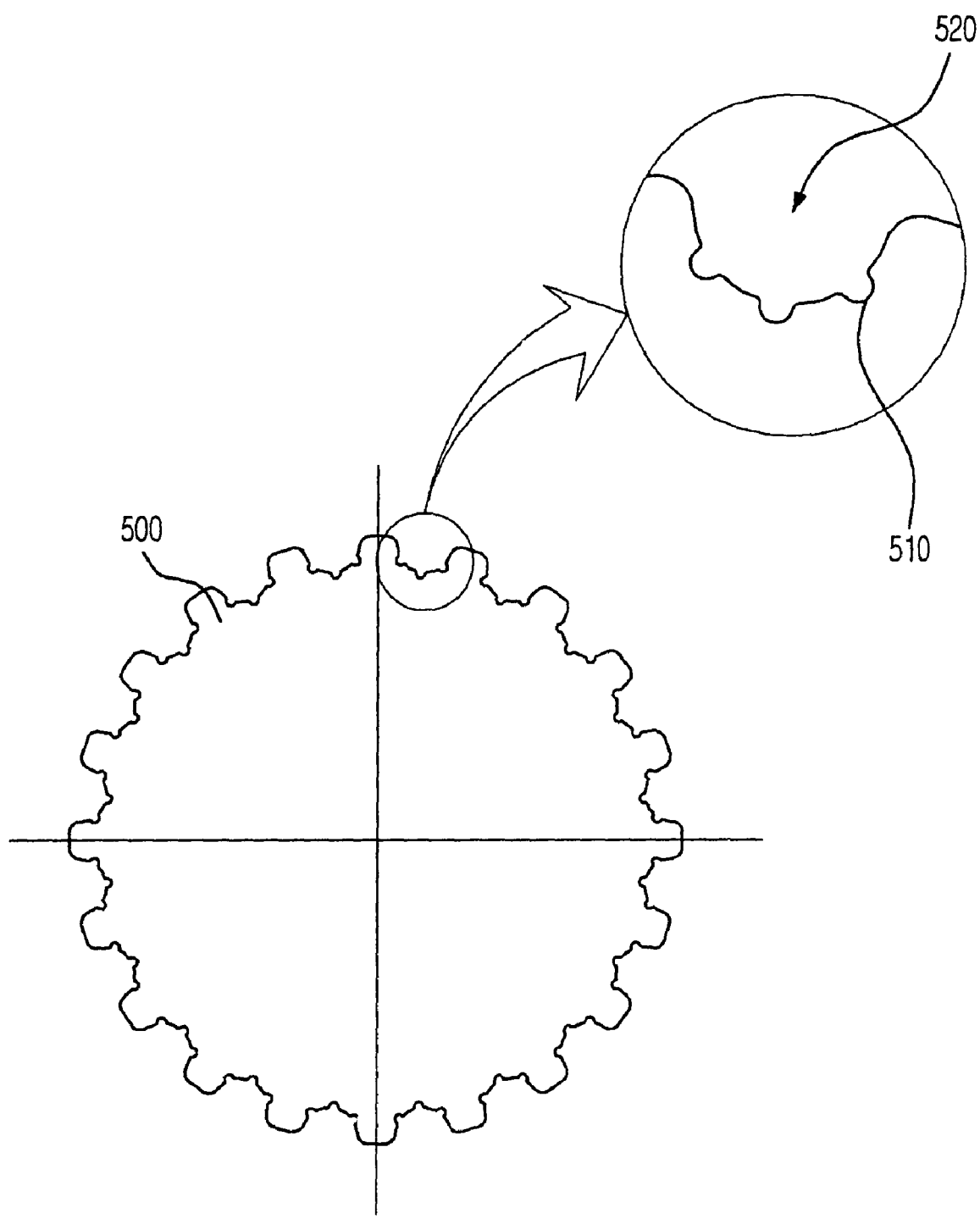
FIG. 8 is a cross sectional view illustrating a sprocket according to the present invention.

As shown in FIGS. 6 and 7, at least one through hole 210 is formed on the surface of the belt thread 200 in width directions. As shown in FIG. 8, the through hole 510 is preferably formed at the threaded portion 520 of the sprocket.

With the above-described constructions, when the bent threaded portion efficiently discharged from the portion between the belt thread 200 and the threaded portion 520 of the sprocket 500 through the through holes 210 and 510, so that the air compression ratio decreases, and the air discharging ratio increases for thereby significantly decreasing the noises and vibrations.

In addition, the threaded portion 520 of the sprocket 500 is preferably engaged with the outer surface of the belt thread portion 200. Here, since the outer surface of the belt thread 200 is formed in an approximately semicircular shape, the threaded portion 520 of the sprocket 500 is preferably formed in the semicircular shape.

The operations and effects of the present invention will be described.

When the sprocket 500 rotates, the threaded surface of the gear of the sprocket 500 is engaged with the thread 200 of the timing belt, so that the timing belt rotates.

At this time, the stress occurred at the threaded surface of the gear of the sprocket 500 is focused at the corner portion 300 of the timing belt. Since the groove 400 is formed at the corner portion 300, the threaded surface of the gear of the sprocket 500 is inserted into the groove 400.

As described above, since the groove 400 is larger than the threaded surface of the gear of the sprocket 500, the threaded surface of the gear of the sprocket 500 does not contact with the groove 400.

Therefore, in the present invention, it is possible to prevent the stress from being focused at the corner portion 300 and the layer formed at the groove 400 from being worn out, so that the life span of the timing belt increases.

In the present invention, since the life span of the timing belt increases, the cost needed for exchange of the timing belt decreases, and the reliability of a corresponding element is enhanced, and the time required for the maintenance decreases. The anti-abrasion property is significantly enhanced, and the unit cost of the fabrication of the timing belt can be largely enhanced as compared to the timing chain.

In addition, the through holes 210 and 510 are formed at the surface of the belt thread 200 and the threaded portion 520 of the sprocket, the flow of the air is enhanced when the bent and the gear contact with each other at a very high speed. The air compression ratio and speed decrease, and the noises and vibration during the operation can be decreased.

The table 1 shows a result of the stress analysis of the bent corner portion based on the belt threads when a jacket is covered according to the present invention.

TABLE 1

|  | Maximum stress | Stress ratio (semicircular threads) |
| --- | --- | --- |
| Trapezoid threads | 59.26 Mpa | 3.49 |
| Semicircular threads | 16.96 Mpa | 1.00 |
| Present invention | 10.97 MPa | 0.65 |

In the present invention, in the case that the groove is formed at the semiconductor thread, and the jacket is covered, 35% stress decrease effect is obtained as compared to the semiconductor threads which do not have any groove in the conventional art, so that the fatigue life span can be increased more than 15 times.

In the case that the jacket is not covered, in the present invention, 11% stress decrease effect is obtained, so that the fatigue life span can be increased at least 2 times through 4 times.

The timing belt and its coupling structure according to the present invention are not limited to the above-described embodiments of the present invention. The present invention may be modified within a range in which the technical concepts of the present invention are allowed.

As described above, the timing belt and a coupling structure of the present invention has the following advantages.

First, as the groove is formed at the corner portion in a width direction, it is possible to prevent the stress from being focused at the corner portion, with stress occurs due to the sprocket. Therefore, the durability and anti-abrasion property of the timing belt can be enhanced.

The life span of the timing belt can be also extended, and the cost needed for exchange of the timing belt decreases, and the reliability of the mechanical part increases, and the maintenance cost is low. The anti-abrasion property can be significantly enhanced, and the unit cost for the fabrication of the timing belt can be largely decreased as compared to the timing chain.

Second, the groove is formed larger than the threaded surface of the gear of the sprocket, and the layer is coated along the groove, so that the layer is not directly contacted with the sprocket, whereby the layer is prevented from being worn out.

Third, the through hole is formed at the threaded surface of the belt or the thread of the sprocket in width directions, the flow of the air is made smooth when the belt and the gear contact at a high speed. The air compression ratio and speed decrease, so that the noises and vibrations occurring during the operation decrease.

Figure 9:
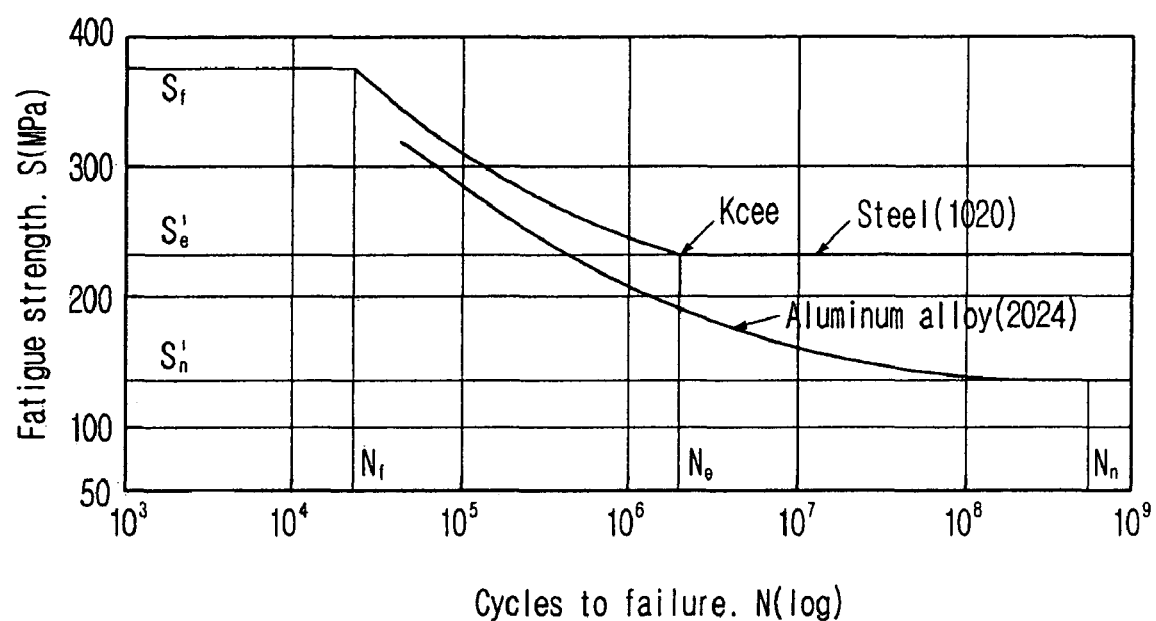
FIG. 9 is a fatigue strength and fatigue life span curve so as to explain the effects of the present invention.

Fourth, as shown in FIG. 9, as shown in the fatigue strength and fatigue life span curve (so called, S-N curve), in the case of common steel, the stress decreases by 20%, and the life span can increase about 10 times.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A timing belt structure comprising:
   a timing belt body having a base surface;
   a tooth protruding from said base surface, said tooth having a root portion adjacent to said base surface of said timing belt body;
   a corner groove formed in said root portion of said tooth in a width direction; and
   a reinforced layer coated on said base surface of said timing belt body, a surface of said tooth, and said corner groove;
   wherein said corner groove is recessed into said tooth such that said corner groove reduces the thickness of said tooth; and
   wherein substantially all portion of said corner groove is disposed within said tooth, and said corner groove is tangent to said base surface of said timing belt body.

2. A timing belt structure of claim 1, further comprising a through groove formed in a portion of said tooth surface other than said root portion.

* * * * *